United States Patent [19]
Bifulco

[11] Patent Number: 5,850,786
[45] Date of Patent: Dec. 22, 1998

[54] APPARATUS FOR PROGRESSIVELY FLATTENING MEAT

[76] Inventor: Phil Bifulco, 1604 N.W. 34th Terrace, Lauderhill, Fla. 33313

[21] Appl. No.: 685,064

[22] Filed: Jul. 23, 1996

[51] Int. Cl.⁶ .................................................. B30B 3/04
[52] U.S. Cl. .............................. 100/53; 99/349; 100/161; 100/168; 100/172; 100/173; 100/176; 100/910; 452/142
[58] Field of Search .................. 100/53, 161, 162 R, 100/163 R, 171, 172, 176, 910, 168, 169, 155 R, 327, 328, 331, 153, 151; 99/349, 353; 219/244; 452/142, 174

[56] References Cited

U.S. PATENT DOCUMENTS

| | | | |
|---|---|---|---|
| 320,848 | 6/1885 | Cathcart | 100/172 |
| 1,691,361 | 11/1928 | Roberts | 99/349 |
| 2,135,960 | 11/1938 | Campbill . | |
| 2,243,492 | 5/1941 | Wilson . | |
| 2,718,028 | 9/1955 | Read et al. . | |
| 3,291,036 | 12/1966 | Perl | 99/349 |
| 3,716,893 | 2/1973 | Vogelsang . | |
| 3,951,059 | 4/1976 | Morris | 100/172 |
| 4,085,482 | 4/1978 | Charron . | |
| 4,261,257 | 4/1981 | Henderson et al. | 99/349 |
| 4,467,497 | 8/1984 | Peterson et al. | 100/153 |
| 4,488,480 | 12/1984 | Miller et al. | 99/349 |
| 4,574,771 | 3/1986 | Gutekunst | 99/349 |
| 5,114,379 | 5/1992 | Prosenbauer | 452/142 |

FOREIGN PATENT DOCUMENTS

| | | | |
|---|---|---|---|
| 0053656 | 6/1982 | European Pat. Off. | 99/349 |
| 463676 | 5/1951 | Italy | 100/172 |
| 358218 | 12/1972 | U.S.S.R. | 100/153 |

OTHER PUBLICATIONS

Information regarding Bridge Cutlet Flattener, Model TR–12, BMC Bridge Machine Co., Inc. dated Mar. 1, 1996.

*Primary Examiner*—Stephen F. Gerrity
*Attorney, Agent, or Firm*—Oltman, Flynn & Kubler

[57] ABSTRACT

A meat flattening machine having two vertically stacked rows of non-sharpened edge stainless steel rollers adjacent to one another in an aluminum frame. Each row has at least two and preferably six rollers wherein the top row is spaced further apart from the bottom rows The plural stacked rows allow for the meat to be pulled and stretched between the rollers for flattening the meat. Four screws connect each corner of the stacked rollers to an adjacent corner of the other stacked rollers to allow for the spacing between the stacked rows to be adjustable. Each roller has parallel rows of rectangular ridges having non-sharpened edges. The bottom roller of each stack can have grooves approximately $\frac{1}{16}$ inch deep, while the above rollers can have grooves approximately $\frac{1}{8}$ inch deep between the rectangular ridges. The frame includes a removable electric motor, stainless steel sprockets and stainless steel chains for rotating the rollers. Removing the motor allows all the remaining components to be inserted into a dishwasher. A removable cover on the frame includes a bump guard for the on and off switch for the motor which prevents the device from being accidentally activated. The cover, the catch tray and the rollers can be stainless steel while the frame can be aluminum. A proximity safety switch can activate the on/off switch only when the cover is on the frame.

9 Claims, 6 Drawing Sheets

APPARATUS FOR PROGRESSIVELY FLATTENING MEAT

This invention relates to a meat preparing device, and in particular to a method and apparatus for progressively flattening meat including veal, poultry, beef, pork, lamb, goat, buffalo, venison and fish fillets in a machine having two vertical stacked rows of rollers wherein the two stacks are parallel to one another and the meats are passed in the space between the rows.

BACKGROUND AND PRIOR ART

Basic techniques for flattening meat have generally required butchers and food preparers having to handle the meat with their hands. Such handling has inherent sanitation problems and the like. Furthermore, such physical handling does not result in a uniform flatness which can be necessary in order to allow for the meat to have a consistent cooking time for all areas of the meat allowing the meat to be cooked evenly, and a final aesthetic plate appearance. Similar problems exist for flattening chicken, veal, beef, pork, lamb, goat, buffalo, and venison.

Several patents have attempted to tenderize meat in rolling machines but still do not overcome the problems presented above. See for example U.S. Pat. No. : 2,135,960 to Campbell; U.S. Pat. No. 2,243,492 to Wilson; U.S. Pat. No. 2,718,028 to Read et al.; U.S. Pat. No. 3,716,893 to Vogelsang; and U.S. Pat. No. 4,085,893 to Charron. The tenderizer type machines pierce and penetrate meat and further cause the meat to be chopped up into separate pieces. None of the prior art overcomes the problems presented above.

SUMMARY OF THE INVENTION

The first objective of the present invention is to provide a method and apparatus for flattening meat having less contamination and sanitation problems than physical handling.

The second object of this invention is to provide a method and apparatus and apparatus for flattening meat that reduces the labor cost for physically handling the meat.

The third object of this invention is to provide a method and apparatus for flattening meat that results in a faster cooking time allowing all the meat to be evenly cooked.

The fourth object of this invention is to provide a method and apparatus for flattening meat that results in the prepared meat having a better plate appearance.

The fifth object of this invention is to provide a method and apparatus for flattening meat that does not pierce nor chop nor shred the meat itself.

A preferred embodiment includes an apparatus and method for flattening meat such as beef, pork, lamb, goat, buffalo, venison, poultry, and fish, without piercing nor shredding the meat which includes a first row of stacked stainless steel rollers, and a second row of stacked stainless steel rollers, the first row of stacked rollers spaced from the second row of stacked rollers, each roller having non sharpened outer edges. The rollers are supported in an aluminum frame and have four elongated screw shafts that each attaches a corner of the first row of stacked rollers to a corresponding corner of the second row of stacked rollers. The screw shafts adjust the spacing between the first row of stacked rollers and the second row of stacked rollers to form a substantially V-cross-sectional shape. Each stack of rollers includes at least three rollers and preferably six rollers stacked on top of one another. Each roller has rows of rectangular raised ridges parallel to each roller axis with each rectangular ridge having non sharpened edges. The top rollers of each row have grooves between the rows of rectangular ridge that are approximately ⅛ inch deep the bottom roller has grooves between the rows of rectangular ridges that are approximately 1/16 inch deep. The frame includes an external cover, an external on and off switch for activating an electric motor in the frame, and a bump guard bar on the cover protecting the external switch from being accidentally activated. A safety switch can activate the on/off switch only when the cover is on the frame.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1A:
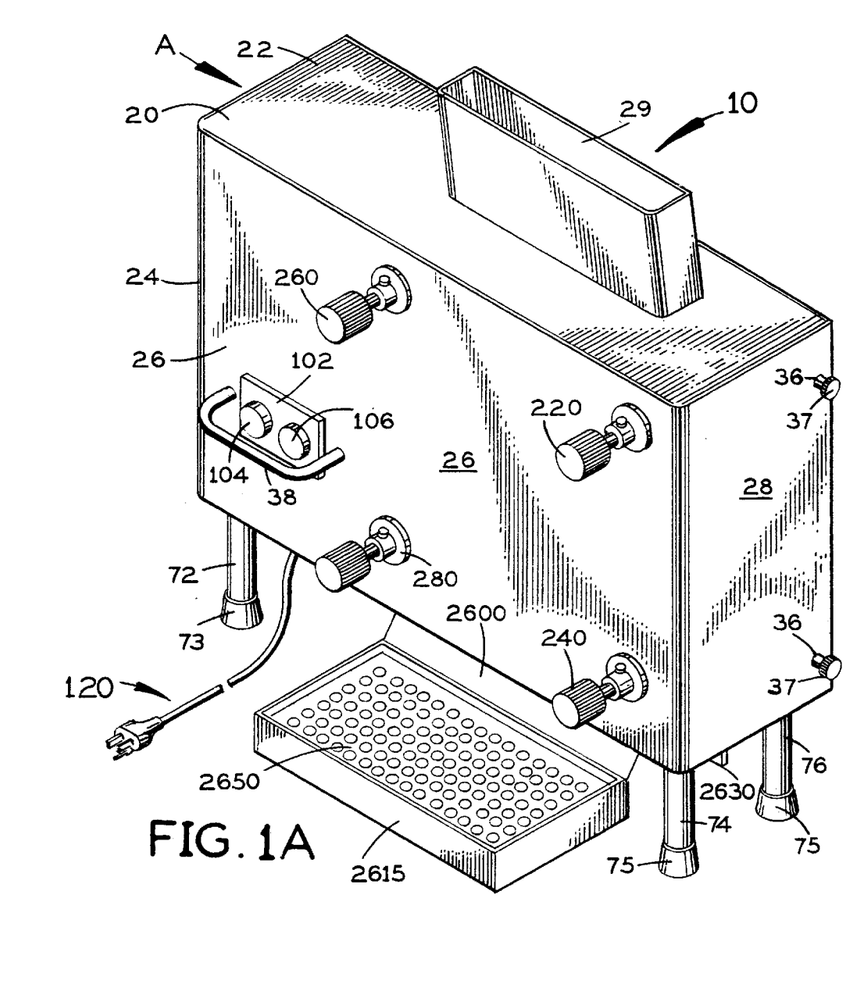
FIG. 1A is a perspective exterior view of the novel meat flattening invention.
Figure 1B:
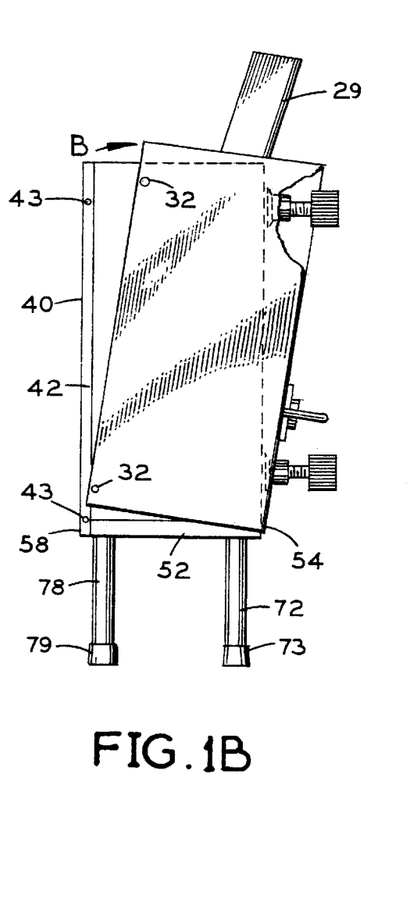
FIG. 1B is a side view of the novel meat flattening invention 10 of FIG. 1A along arrow A.
Figure 2:
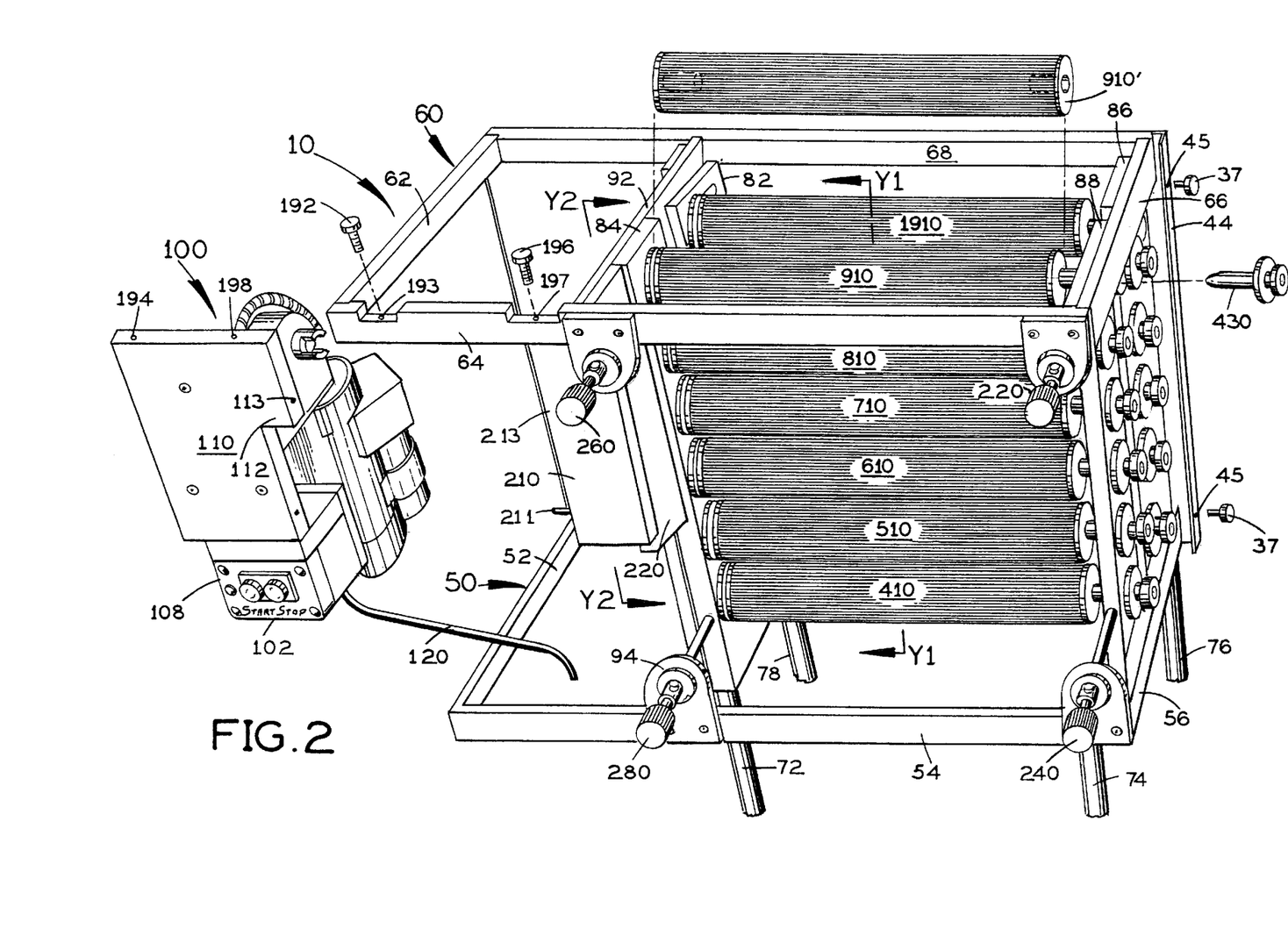
FIG. 2 is an exploded view of the meat flattening invention of FIG. 1 without the cover.

FIG. 1A is a perspective exterior view of the novel meat flattening invention 10. FIG. 1B is a side view of the novel meat flattening invention 10 of FIG. 1A along arrow A. FIG. 2 is an exploded view of the meat flattening invention 10 of FIG. 1 without the main cover 20. Referring to FIGS. 1A, 1B and 2, invention 10 includes a one piece cover 20 having top portion 22 with tilted hollow feed chute 29, left side 24, front side 26, and right side 28. Cover 20 is held in place through sides 24, 28 by screwable knobs 33 and 37 that pass through side holes 32, 36 (one side shown in FIG. 1B) and into threaded holes 43, 45 of vertical flanges 42, 44 and is removed from the back frame 40 in the direction of arrow B (shown in FIG. 1B). Vertical frame cylindrical support legs 72, 74, 76, 78 having respective rubber feet 73, 75, 77, 79 are attached beneath lower rectangular support frame 50, the latter which is attached to back frame 40 by conventional fasteners such as screws, nuts and the like. Lower rectangular frame 50 includes bottom left outside frame member 52, bottom front outside frame member 54, bottom right outside frame member 56 and bottom rear outside frame member 58. Upper rectangular support frame 60 having members 62, 64, 66 and 68 are similarly attached to one another and to back frame 40 by conventional fasteners such as screws, nuts and the like. Upper rectangular support frame 60 includes top left outside frame member 62, top front outside frame member 64, top right outside frame member 66 and top rear outside frame member 68. Upper rectangular support frame 60 is attached to lower rectangular support frame 50 by left rear shaft block 82, left front shaft block 84, right rear shaft block 86 and right front rear shaft block 88. Top front outside frame member 64 is connected to top rear outside frame member 68 by top left inside frame member 92, the latter of which is attached to a top portion of left rear shaft block 82 and left front shaft block 84. Similarly, bottom front outside frame member 54 is connected to bottom rear outside frame member 58 by bottom left inside frame member 94 (more clearly shown in FIG. 5A), the latter of which is attached to a bottom portion of left rear shaft block 82 and left front shaft block 84. The twelve removable stainless steel rollers (five are shown in FIG. 2) 410, 510, 610, 710, 810, 910, 1910 are described in greater detail in reference to FIG. 6. The removable sliding tray 2600 is described in FIG. 8.

Referring to FIGS. 1A and 2, cover front portion 26 has an opening for allowing on/off switch 40 to protrude therethrough. Attached to the front cover is a U-shaped bumper guard bar 38 which prevents the ON button 106 and OFF button 104 from being accidentally activated. A proximity switch is included which has a metal contact 108 on switch 102 wherein a metal screw 109 on the back of the bumper guard 38 in conductive contact with metal contact 108 allows the ON/OFF switch to be operated only when cover 20 is in place.

Figure 3A:
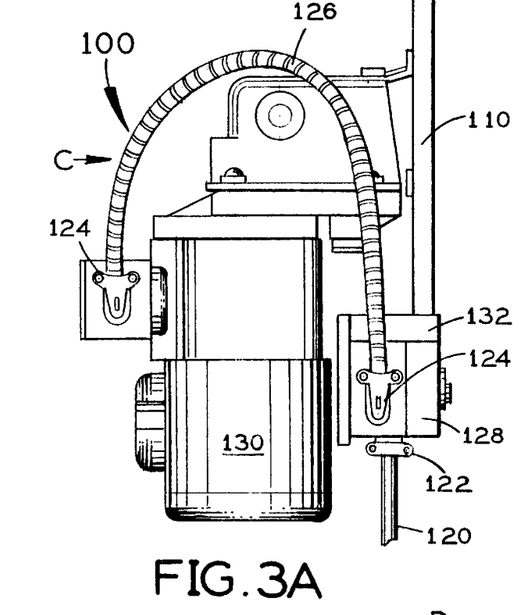
FIG. 3A is a side view of the removable motor of the meat flattening invention of FIG. 2.
Figure 3B:
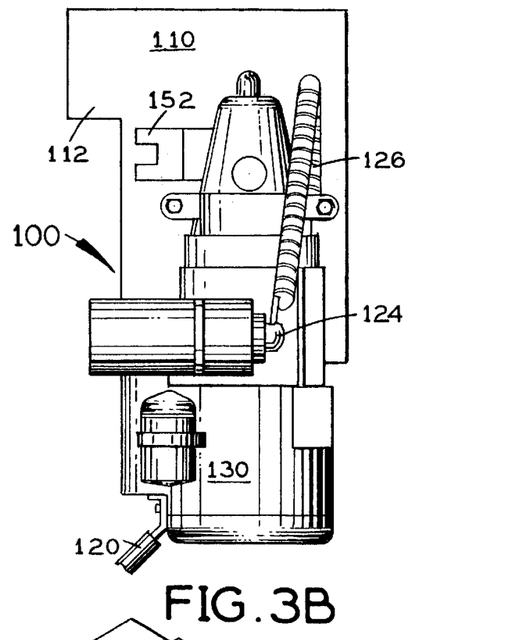
FIG. 3B is a rear view of the motor of FIG. 3A along arrow C.

FIG. 3A is a side view of the removable motor 100 of the meat flattening invention 10 of FIG. 2. FIG. 3B is a rear view of the motor 100 of FIG. 3A along arrow C. Referring to FIGS. 2, 3A, 3B, motor 100 can a 120 Volt DC motor 130 with a typical three prong electric cord 120, a bottom electric clamp 122, electric box assembly 128 with On/Off buttons 102, 104, 106, top electric box plate 132, electric cable 126 having side electric clamps 124. Motor 100 includes a front plate 110 with a prong slot 111 and a side extended portion 112 having a slot for being mateable to the prongs 211 and 213 on a motor plate 210 mounted on a spacer plate 220 to top left inside frame member 92. By separating female sockets 111, 113 from male prongs 211, 213, the motor 100 can be removed from the rest of the meat flattening invention 10 in order to allow for the other components such as the frame members and rollers to be placed in a dishwasher. Referring to FIGS. 2–3, motor 100 is attached to top front outside frame member 64 by screws 192, 196 passing through holes 193, 197 into threaded openings 194, 198, respectively on the top of front plate 110. Rotating engine drive block end 852 will be described in reference to FIGS. 7A–7B.

Figures 4A, 4B:
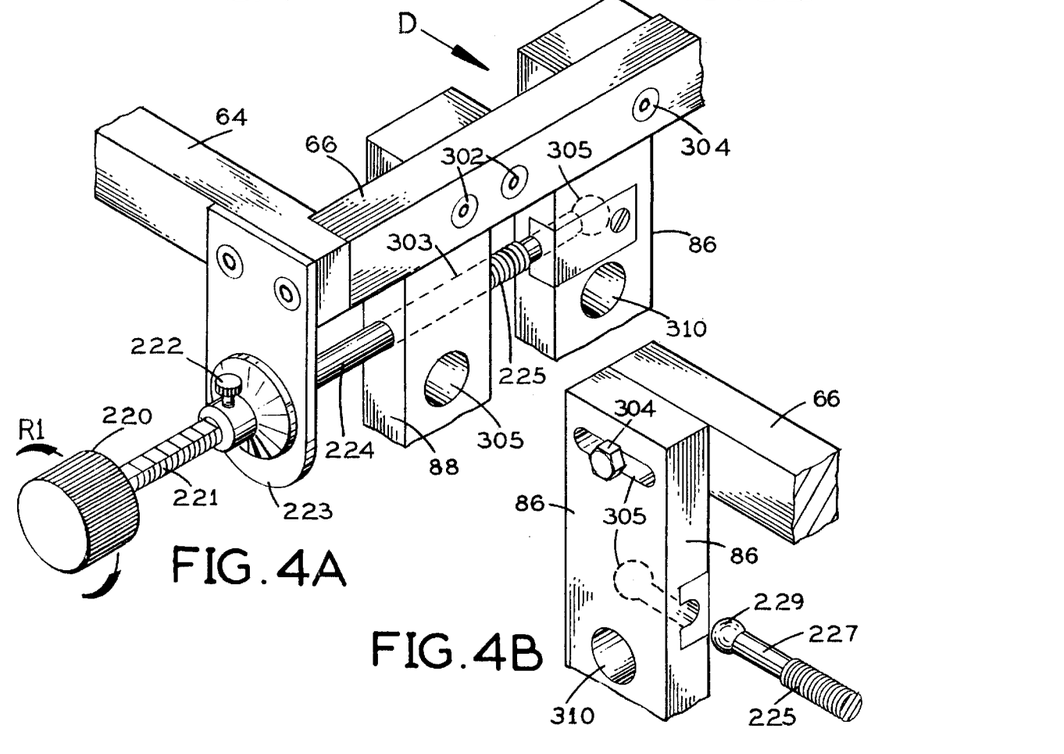
FIG. 4A is a enlarged view of a roller spacing adjustment knob with rear and front shaft blocks.
FIG. 4B is an view of the rear shaft block of FIG. 4A along arrow D.

FIG. 4A is a enlarged view of upper right roller spacing adjustment shaft knob 220 used in the meat flattening machine 10 of FIG. 1A, 2 with rear shaft block 86 and front shaft block 88. FIG. 4B is an view of the rear shaft block 86 of FIG. 4A along arrow D. Referring to FIGS. 4A–4B, front shaft block 88 is fixably mounted by fasteners 302 such as nuts and bolts to top right outside frame member 66, while rear shaft block 86 is movable relative to top right outside frame member 66 by bolt 304 which is slideable within slot 305 of rear shaft block 86. Adjustment shaft 224 is mounted in a shaft guide 223 and loosely passes through side-hole 303 of front shaft block 88 which can likewise have a threaded interior for receiving the threaded shaft portion 225, the latter having an enlarged bulbous portion 229 fitting within socket 305 of rear shaft block 86. Adjustment knob 220 rotatable along the direction of arrow R1 moves rear shaft 86 along the direction of arrow S1 adjusting the spacing distance between the rollers mounted in throughholes 305, 310 (to be discussed in greater detail later). The spacing S1 between shaft blocks 86, 88 can be set by the metering numbers 2–16 on threaded shaft end 221 that is mateable to interior threads in shaft guide 223 and the threaded portion 225 with interior threads of through-hole 303.

Figures 5A, 5B:
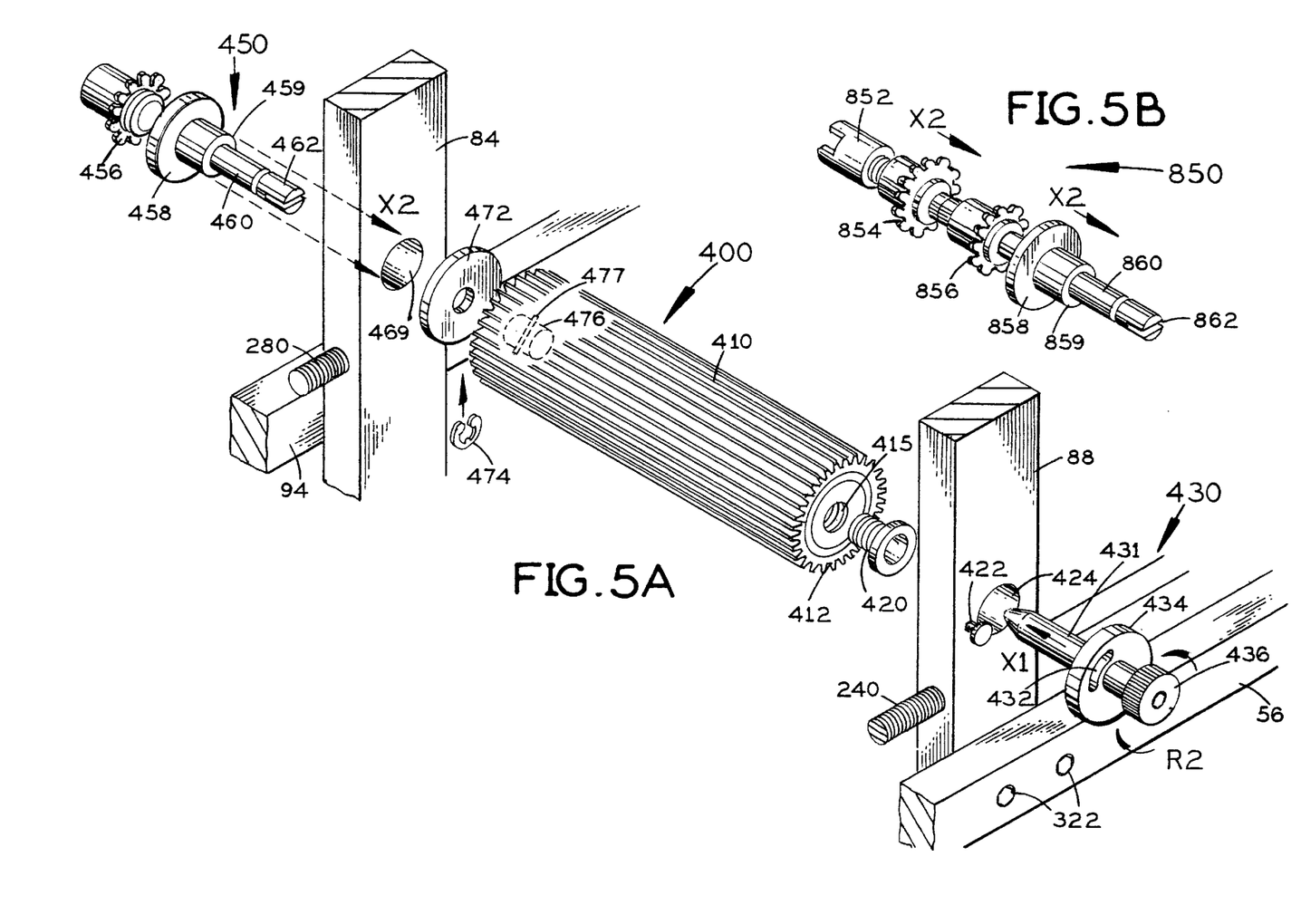
FIG. 5A is an exploded view of a single roller assembly of the invention of FIG. 2.
FIG. 5B is an exploded view of left roller shaft bearing with engine drive block connector.

FIG. 5A is an exploded view of a single roller assembly 400 of the invention of FIG. 2. FIG. 5B is an exploded view of the left roller shaft bearing 850 with drive block shaft connector 852 which is more clearly shown in FIGS. 7A–7B. Referring to FIG. 5A, roller assembly 400 includes front shaft block 88 perpendicularly mounted to bottom right outside frame member 56 by fasteners 322 such as screws and bolts, and left front shaft block 84 perpendicularly mounted to bottom left inside frame member 94 by fasteners 342 such as screws and bolts. Stainless steel roller 410 has exterior grooves 412 between raised rectangular ridges that can be approximately ¹⁄₁₆ inches deep. The remaining rollers will be described in reference to FIG. 6.

Referring to FIG. 5A, roller 410 has a right side cylindrical opening 415 for receiving mounting cap 420 which receives pin portion 431 of pin shaft assembly 430. Pin portion 431 has a disc shaft base 432 with a curved oblong slot 434 for passing over a locking head screw 422 on front shaft block 88. Gripping end 436 allows a user to manipulate the pin portion 431 in the direction of arrow X1 through side opening 424 of front shaft block 88. Locking head screw 422 passes through curved slot 434. Finally, gripping end 436 and disc shaft base 432 is rotated in the direction of R2 locking the pin shaft assembly 430 and roller 410 to front shaft block 88. Roller 410 has a left side cylindrical pin socket 476 with a horizontal member 477 dividing the socket 476 down its middle. A forked shaped end 462 of roller pin 460 wraps about horizontal member 477. Roller pin 460 has an end idler sprocket 456, and a disc base 458 with cap tip 459 which fits into side through-hole 469 of left front shaft block 84 in the direction of arrow X2. A shaft ring 472 and bendable locking nut 474 hold rolling pin 460 in place.

FIG. 5B shows an exploded view of a similar single roller assembly having drive block shaft end 852 which mates to the drive block engine mount 152 shown in FIG. 3B. Idler sprockets 854, 856 connect the drive block shaft end 852 to disc base 858, cap tip 859, roller pin 860 and prong end 862 connects to roller 810 (see FIG. 6). These components operate similar to the like components in left roller shaft bearing 450. The operation of drive block shaft end 852 will be described in greater detail in reference to FIGS. 7A–7B.

Figures 6, 7A:
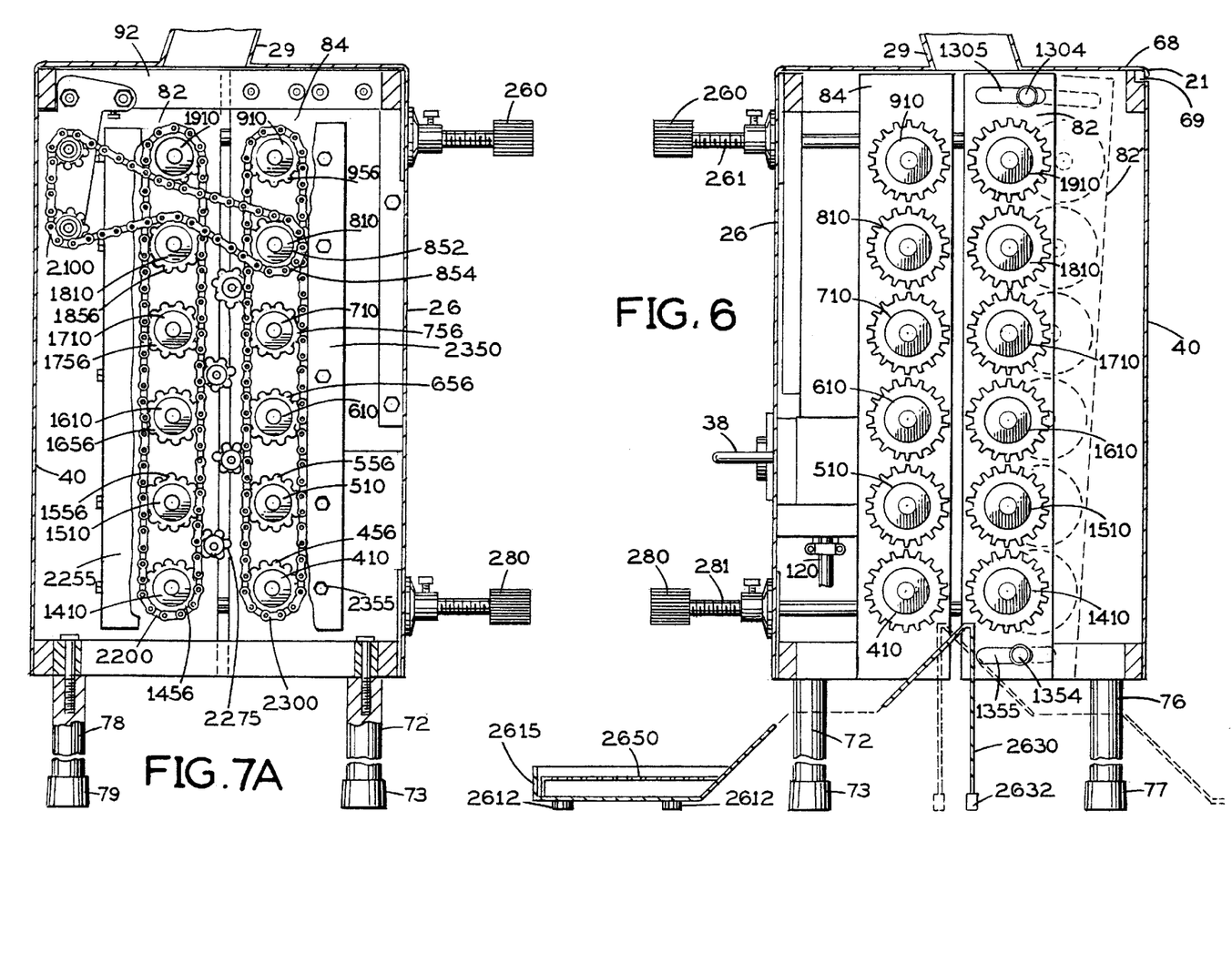
FIG. 6 is a cross-sectional side view of the meat flattening invention of FIG. 2 along arrow Y1.
FIG. 7A is a cross-sectional side view of the meat flattening invention of FIG. 2 along arrow Y2.

FIG. 6 is a cross-sectional view of the meat flattening invention of FIG. 2 along arrow Y1. Lip edge 21 on the rear of the top cover portion 22 can snap in place behind a longitudinal groove 69 in top rear outside frame member 68 (shown more clearly in FIG. 2). In FIG. 6, lower rollers 410 and 1410 have identical grooved surfaces, while rollers 510, 610, 710, 810, 910, 1510, 1610, 1710, 1810 and 1910 have raised rectangular ridges that are approximately ⅛ inches deep. Upper left roller spacing adjustment shaft knob 260 with threadable shaft 261 and lower right roller spacing adjustment knob 280 with threadable shaft 281 move left rear shaft block 82 in the direction of arrow S1 up to position 82' while sliding screws 1304, 1354 within slots 1305, 1355, correspond to the like components 304, 305 of upper right roller spacing adjustment shaft knob 220 described in FIGS. 4A–4B. Upper right roller spacing adjustment shaft knob 220, lower right roller spacing adjustment knob 240, upper left roller spacing adjustment shaft knob 260 and lower left roller spacing adjustment shaft knob 280 can be manipulated to form an overall spacing S6 between the two vertical rows of rollers having a V-cross-sectional shape in order to optimize the meat flattening action therebetween.

Figure 7B:
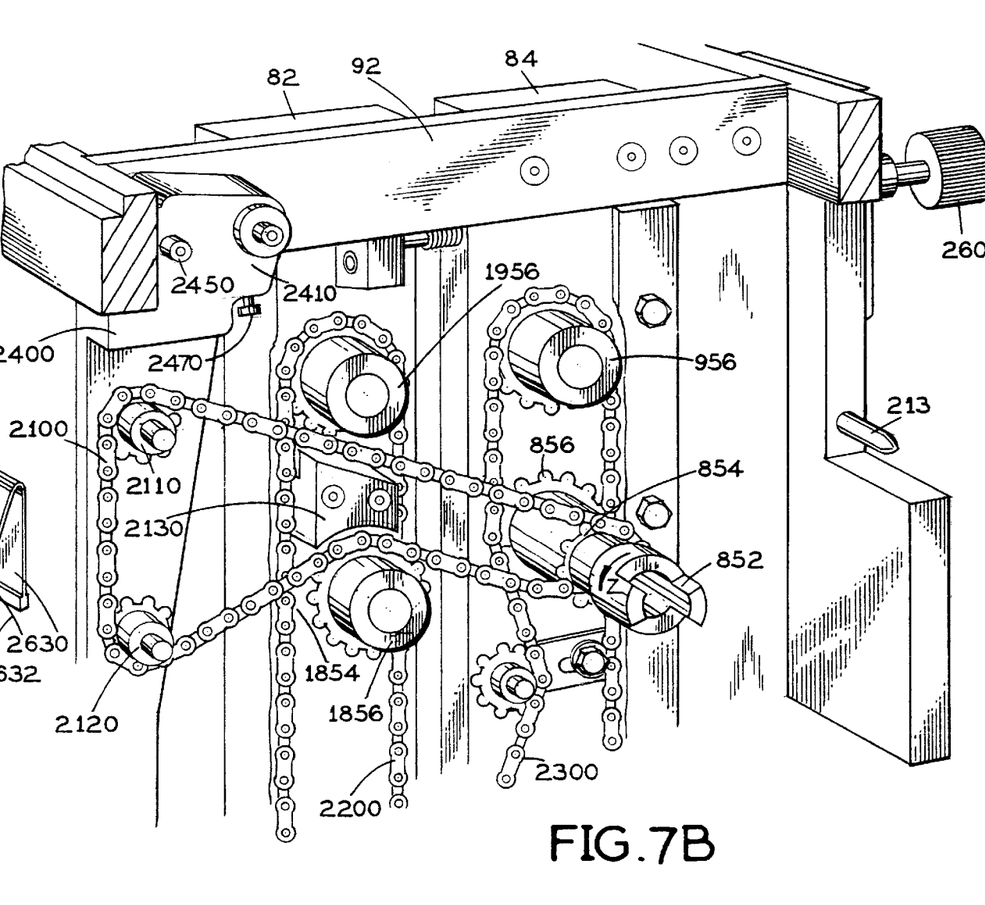
FIG. 7B is an enlarged view of the main chain drive assembly of FIG. 7A.

FIG. 7A is a cross-sectional side view of the meat flattening invention 10 of FIG. 2 along arrow Y2. FIG. 7B is an enlarged view of the main chain drive assembly of FIG. 7A. Referring to FIGS. 7A, 7B, motor drive block 152 (shown in FIG. 3B) mateably connects to shaft drive block 852 causing the latter to rotate in the direction of arrow Z1. The rotating of idler sprocket 854 connects causes main drive chain 2100 to in effect rotate idler sprockets 1956 and 1856 respectively. A vertical pair of idler block sprockets 2110, 2120 and plastic chain guide 2130 further support main drive chain 2100 in place. Idler block sprockets 2110, 2120 are mounted to movable block 2400 which pivots about pivot point 2450. A screw 2470 abutting against surface 2410 determines the relative position of block 2400 and in effect can tighten or loosen chain 2100. The rotating of idler sprocket 856 causes first large chain 2300 to rotate and effect the rotation of adjacent chain attached idler sprockets 956, 756, 656, 556, 456. Likewise, the rotating of idler sprockets 1856 causes second large chain 2200 to rotate and effect the rotation of attached idler sprockets 1956, 1756, 1656, 1556, 1456. The rotating of these idler sprockets directly cause their respective attached rollers to rotate. Side mounted plastic block guides 2250, 2350 with screw fasteners 2255, 2355 and additional idler sprockets 2275 guide and support their respective chains 2200, 2300.

Figure 8:
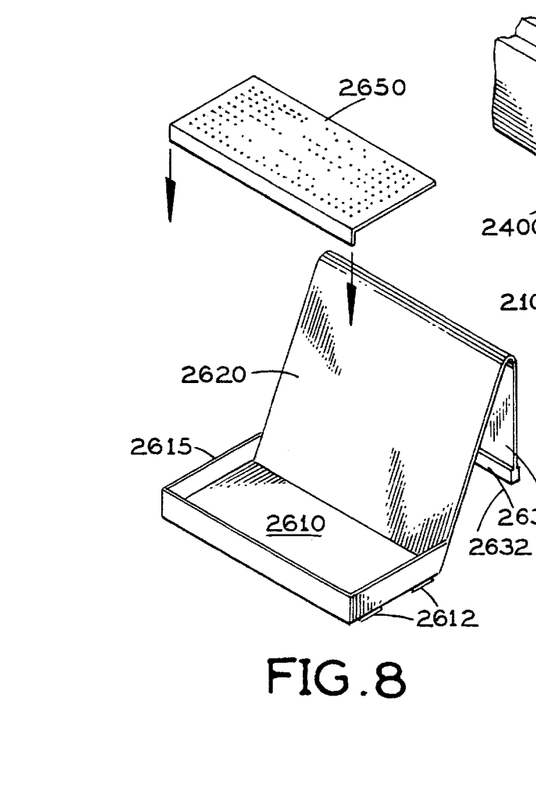
FIG. 8 is an enlarged view of the removable catch tray of FIG. 1A and 6.

FIG. 8 is an enlarged view of the removable catch tray 2600 of FIGS. 1A and 6, which includes a base 2610 having rubber feet 2612, and vertical rectangular forming sides 2615 which can support separately removable grate 2650 therein. An approximately forty-five degree slide portion 2620 and a vertical support wall 2630 with rubber shoe 2632 catch the flattened meat passing through the rollers of the meat flattening invention of FIGS. 1A and 2.

The basic frame members can be formed from aluminum while the remaining components such as the rollers and fasteners can be stainless steel and the like.

The preferred embodiment describes the invention as flattening meat. For the purposes of this invention, meat includes beef, poultry, veal, pork, lamb, goat, buffalo, venison and fish filets. The invention works well with rinsing the boneless filets of meat with fresh cold water before insertion into the apparatus.

Although the preferred embodiment describes using six rollers on each side of the apparatus, the invention can be used with at two stacked rollers on each side, three stacked rollers on each side, four stacked rollers on each side, five stacked rollers on each side or seven or more stacked rollers on each side.

Although, the V-cross-sectional shape of the rollers can be formed by the adjustable spacing between the rows, the V-cross-sectional shape can be formed in other ways. The top rollers can have a smaller diameter than the bottom rollers in each row, or the top rollers can have more coarse or deep grooved surface patterns than the bottom rollers.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. An apparatus for flattening meat without piercing nor shredding the meat comprising:

a first row of stacked rollers, each roller having non-sharpened outer edges;

a second row of stacked rollers, each roller having non-sharpened outer edges, the first row of stacked rollers being spaced and fully separated from the second row of stacked rollers;

means for adjusting the spacing between the first row of stacked rollers and the second row of stacked rollers, wherein meat passing between the first and the second rows of stacked rollers is substantially flattened but not pierced nor shredded;

wherein the means for adjusting the spacing includes:
      means for adjusting the spacing between each outer corner of said rows of stacked rollers to form a substantially V-cross-sectional shape.

2. The apparatus for flattening meat of claim 1, wherein the means for spacing includes:

four screws at each of the corners of the first row of stacked rollers, wherein each screw attaches a first corner of the first row of stacked rollers to a corresponding corner of the second row of stacked rollers.

3. The apparatus for flattening meat of claim 1, wherein each of the two rows of rollers include:

at least three rollers stacked on one another.

4. The apparatus for flattening meat of claim 1, wherein each of the two rows of rollers include:

at least six rollers stacked on one another.

5. The apparatus for flattening meat of claim 1, further comprising:

a single first main chain for rotating each of the rollers in the first row;

a single second main chain for rotating each of the rollers in the second row; and a main chain for rotating both the single first chain and the single second chain.

6. An apparatus for flattening meat without piercing nor shredding the meat comprising:

a first row of stacked rollers, each roller having non-sharpened outer edges;

a second row of stacked rollers, each roller having non-sharpened outer edges, the first row of stacked rollers being spaced and fully separated from the second row of stacked rollers;

means for adjusting the spacing between the first row of stacked rollers and the second row of stacked rollers, wherein meat passing between the first and the second rows of stacked rollers is substantially flattened but not pierced nor shredded;

a top roller having grooves between rows of rectangular ridges that are approximately ⅛ inch deep; and a bottom roller having grooves between rows of rectangular ridges that are approximately 1/16 inch deep.

7. An apparatus for flattening meat without piercing nor shredding the meat comprising:

a first row stacked rollers, each roller having non-sharpened outer edges;

a second row of stacked rollers, each roller having non-sharpened outer edges, the first row of stacked roller being spaced and fully separated from the second row of stacked roller;

means for adjusting the spacing between the first row of stacked rollers and the second row of stacked rollers, wherein meat passing between the first and the second rows of stacked rollers is substantially flattened but not pierced nor shredded;

a frame for supporting the first row of stacked rollers, the second row of stacked rollers, and the means for adjusting the spacing between said first and second rows of stacked rollers; and a removable electric motor attached to the frame for supplying power to rotate each of the rollers, wherein removing the supplying motor allows the frame to be washed and cleaned.

8. The apparatus for flattening meat of claim 7, further comprising:

an external cover for the frame;

an external on and off switch for activating the electric motor; and a bump guard bar on the cover protecting the external switch from being accidentally activated.

9. An apparatus for flattening meat without piercing nor shredding the meat comprising:

a first row of stacked rollers, each roller having non-sharpened outer edges;

a second row of stacked rollers, each roller having non-sharpened outer edges, the first row of stacked rollers being spaced and fully separated from the second row of stacked rollers;

means for adjusting the spacing between the first row of stacked rollers and the second row of stacked rollers, wherein meat passing between the first and the second rows of stacked rollers is substantially flattened but not pierced nor shredded;

a frame for supporting the first row of stacked rollers, the second row of stacked rollers, and the means for adjusting the spacing between the first and second rows of stacked rollers, wherein said frame is made of aluminum and said rollers are made of stainless steel, further comprising:

a stainless steel cover surrounding and substantially enclosing said frame and rollers; and a stainless steel catch tray beneath said first and second rows of stacked rollers for catching flattened meat.

* * * * *